Aug. 18, 1953     H. B. SMITH ET AL     2,649,529
MEANS FOR AND PROCESS OF HEAT-TREATING
MATERIAL TO BE WELDED TOGETHER
Filed Jan. 5, 1951     5 Sheets-Sheet 4
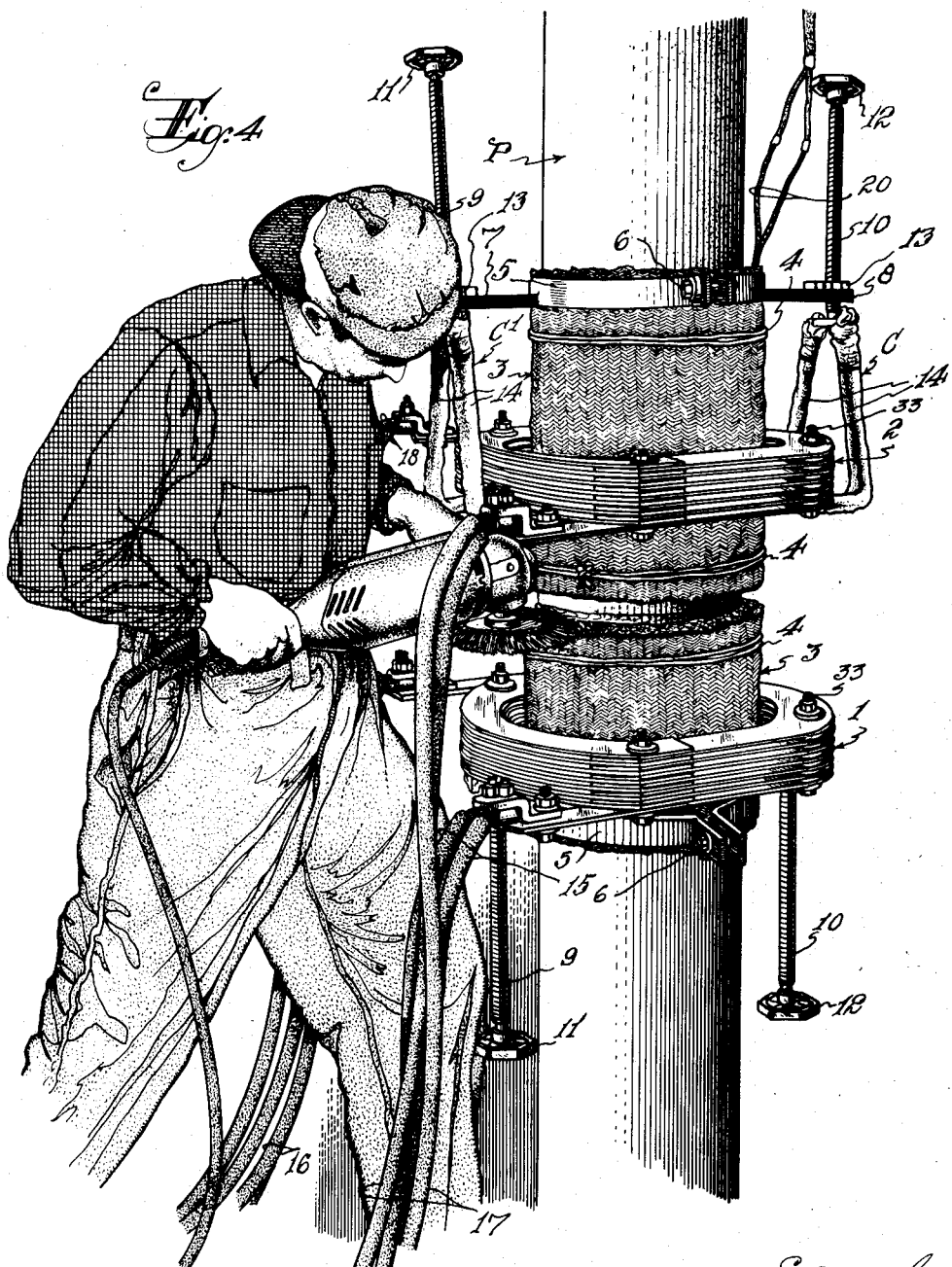

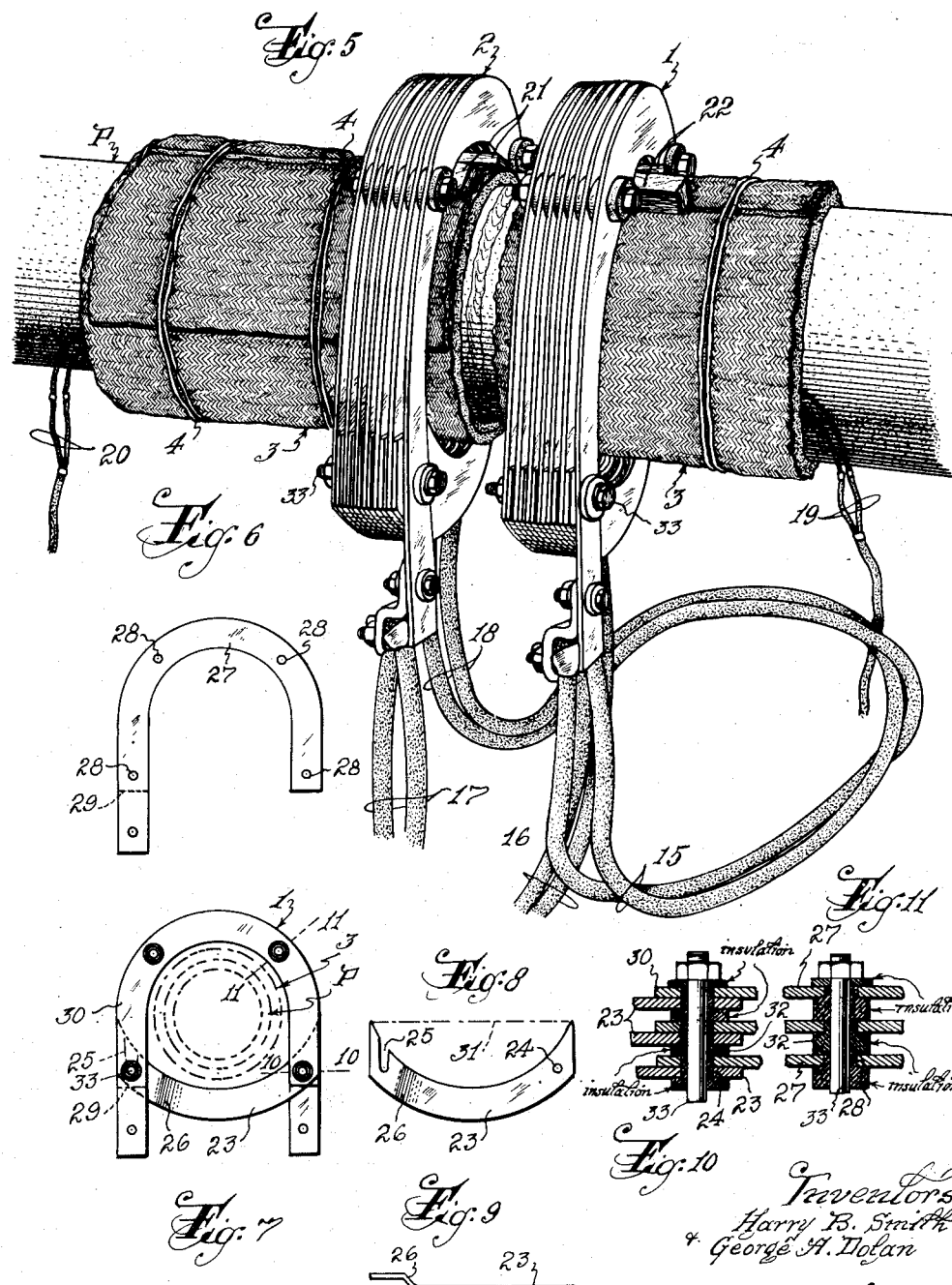

Patented Aug. 18, 1953

2,649,529

UNITED STATES PATENT OFFICE 2,649,529

MEANS FOR AND PROCESS OF HEAT-TREATING MATERIAL TO BE WELDED TOGETHER

Harry B. Smith, Westfield, and George A. Dolan, East Orange, N. J.

Application January 5, 1951, Serial No. 204,638

8 Claims. (Cl. 219—10)

This invention relates to a means and process for using the same for welding together metal parts such as pipes. In the welding of pipes there are usually three steps involved namely, pre-heating, arc welding, normalizing or stress relieving. In the earlier days of arc welding different means for relieving stresses in the metal before and after the weld was made were utilized, for example such as oven type heaters which would fit around the pipe, the oven being heated by gas or fuel oil. Following this, electrical resistance heating strips were attached to the pipe. All of these older methods became obsolete at the time the applicants in this case developed their method of procedure outlined in Patent No. 2,184,534, issued December 26, 1939.

Since that time higher pressures have been introduced into piping systems used especially in new steam plants and because of the higher pressures utilized chrome-molybdenum and carbon-molybdenum, steel piping came into use. With this change in pressure and type of piping it was found that flanged, bolted, pivoted or rolled joints were no longer adequate and welding came into vogue as solving the difficulties. These special alloys did not respond to ordinary arc welding methods. Stresses set up in the metal by reason of low cold ductility in the alloy would frequently cause cracks after one or more welding passes. Even when the defects were not apparent on the surface, radiographs disclosed that a large percentage of such welds contained flaws.

According to our patent above referred to the pipes to be welded together were wrapped at the ends adjoining the weld area with asbestos sheets and over this wound a coil consisting of several turns of heavy wire encased in asbestos tubing in such a way that part of the coil was on one side of the weld and part on the other. On passing an alternating current of a suitable number of amperes through these coil turns, the resulting induction heat was fairly uniformly distributed and the process set forth in our patent was a complete answer to the difficulties presented. In one large installation using the Smith-Dolan process approximately 8,000 welds were made with no record of failure in the process set forth. In our patent referred to we have found wherein the means and process can be greatly improved in many ways, one very important way being a decided step in advance for in the construction of a heating coil it can be applied in a very short time as compared with the prior method of winding turns of heavy copper wire over the asbestos which was first applied to the pipe ends.

In this earlier process of ours it was necessary, where the heating current was large, 1000 amperes or more, to cut off the pre-heating current while the weld was being made because of the high heat generated at the joint and because the magnetic field interfered with the laying down of the metal from the arc. To avoid this we have provided heating coils which may be readily and quickly adjusted so that the coils may be separated to give the workmen more room and to move the heat generated by the coils farther away from the weld, it being understood that the arc itself produces considerable heat at this junction. Also with the coils separated and the current adjusted at the source of supply, usually a transformer located close to the work, a more uniform result can be obtained than in the process of our patent where the coils are wound on by hand and were not axially adjustable on the pipe ends. At the time of filing our application in the latter part of 1937 it was the practice to chip the metal at some part of the weld as each layer of weld metal was applied to the joint. With our new process we can move the heating coils apart if necessary and clean the weld surface with a wire brush operated by a small electric motor, see Figure 4. Furthermore, it has been found that with our system radiographs can be made in a few minutes so that if any defect is found in the weld it can be removed without allowing the pipe to cool down to some relatively low point as in the earlier days and thereby prevent stresses from being set up in the pipe before the welding is started up again.

We have found from practical experience that the spacing of the heating coils is a very important step as the flux from both coils combines in the center between the coils thereby giving the maximum temperature at that point as the width of the uniform heat zone depends on the distance between the coils for a given pipe diameter. If the space between the coils is too close the uniform heat band will be very narrow and if the coils are too far apart, the temperature at the center between the coils will be lower than at the area adjacent to the outer sides of the coils. Hence by having coils that are adjustable along the length of the pipe by means which will be later described, this permits the operator to adjust the coils to the proper position in order to maintain the desired uniform heat band.

Another great advantage of the movable coils is that the welding takes place at a temperature usually between 500 and 600 degrees. Since time is valuable and labor costs high, it is essential to bring the temperature up to pre-heating point as quickly as possible. However, it is not necessary to maintain an absolute uniform temperature for the pre-heating cycle. It is the principal object of our invention to provide means and process of procedure for overcoming the objects heretofore set forth. A further object of our invention is to provide heating coils that can be easily put into place on a pipe and adjusted to give the best heating effects for the welding operations. Another further object of our invention is to provide heating coils which can be quickly adjusted to any desired position in order to attain the great advantage heretofore set forth. These and other advantages will be readily appreciated by one skilled in this particular art from a reading of the following description in connection with the attached drawing wherein, Figure 1 is what may be termed a front view showing a pair of coils positioned on a vertical pipe;

Figure 4 is a view similar to Figure 3 but with the heating coils moved apart for the purpose of cleaning the weld;

Figure 5 is a view showing a pair of heating coils applied to a horizontal pipe;

Figure 6 is a plan view on a reduced scale of a major turn of the coil as well as an outside turn to which an electrical connection is made;

Figure 7 is a plan view on a reduced scale of one of the complete coils;

Figure 8 is a view of one of the closing bars for completing the connection from one layer turn to the next;

Figure 9 is a side view of Figure 8;

Figure 10 is a view on the line 10—10 of Figure 7;

Figure 11 is a view on the line 11—11 of Figure 7.

Figure 1:
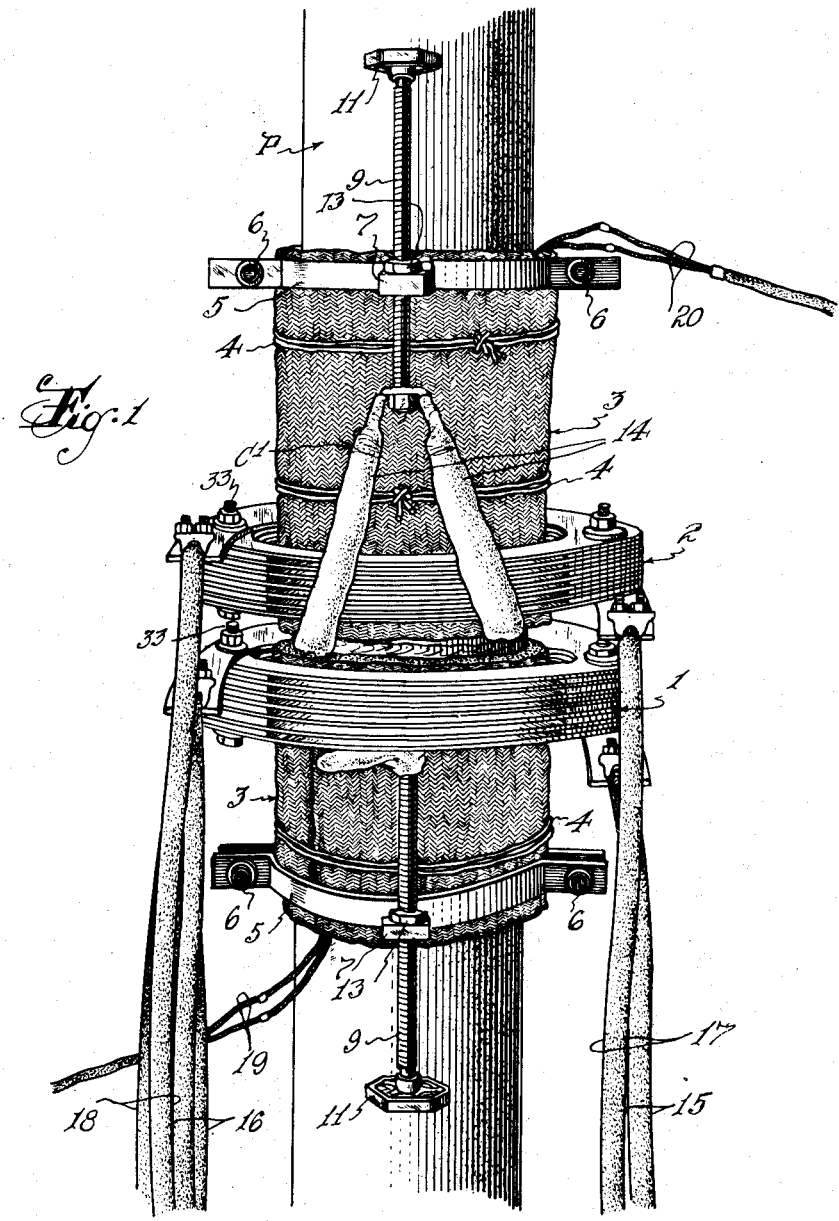
Figure 2:
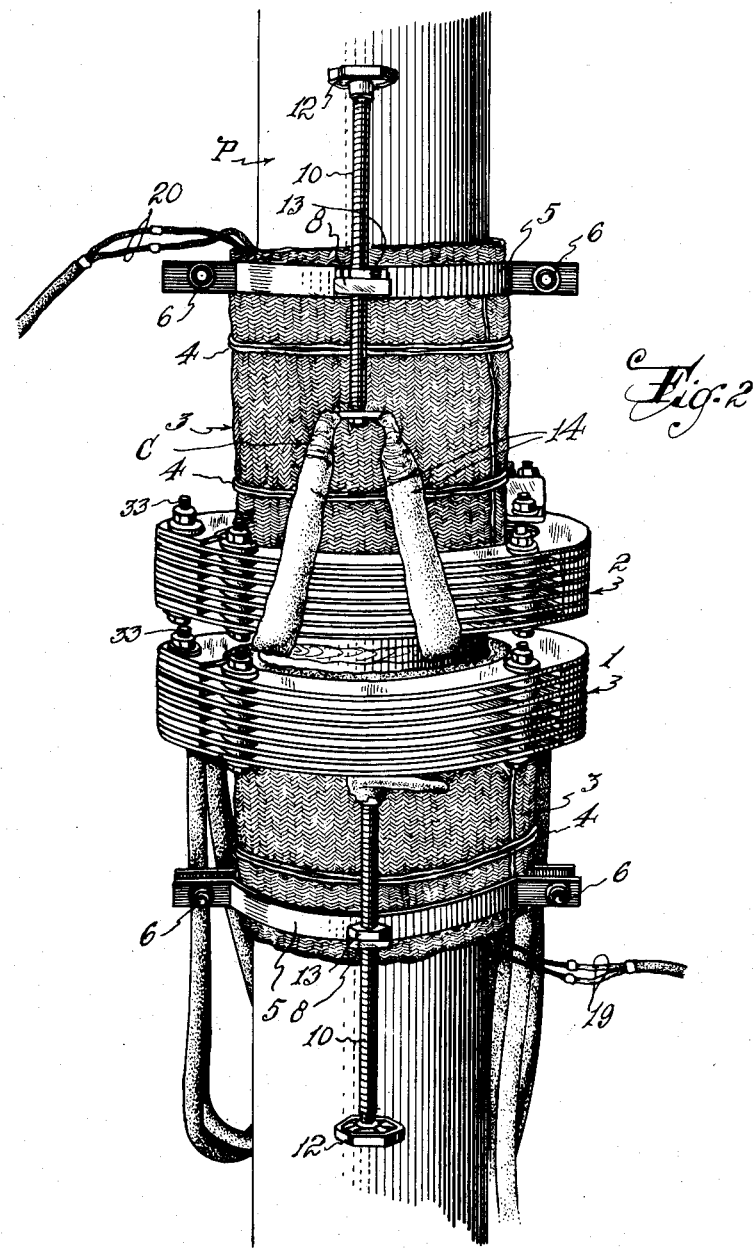
Figure 2 is a view similar to Figure 1 but looking from the opposite or rear side.
Figure 3:
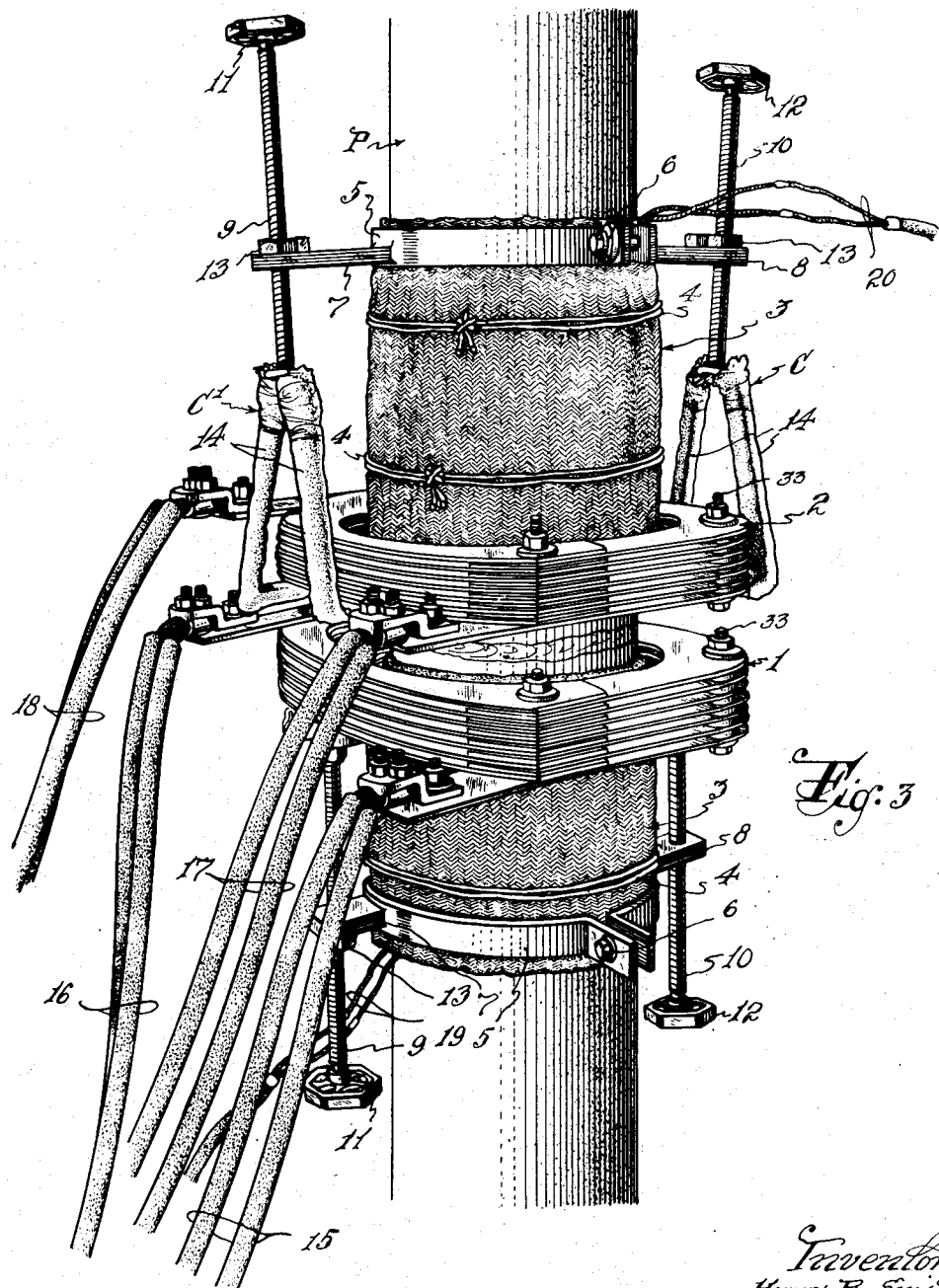
Figure 3 is what might be termed a side view of the arrangements shown in Figures 1 and 2.

In the different views wherein like numbers refer to corresponding parts, 1 and 2 are a pair of similar coils positioned over a few turns of sheet asbestos 3 which is held in place by a plurality of wire loops 4. Fastened around the pipe P is clamping strap 5 preferably made in two pieces as shown in Figure 1 and held in place by studs and nuts 6. To the clamp 5 are fastened as by welding, a pair of arms 7 and 8, the outer ends of which are threaded to receive adjusting screws 9 and 10 having end wheels 11 and 12. Also each of the screws 9 and 10 are provided with lock nuts 13. Attached to the lower end of each of the adjusting screws 9 and 10 is a pair of clamps or hooks C collectively having arms 14 which are covered with insulating material such as asbestos sheet so that the coils to which they are attached such as 2 will not be grounded or short circuited. The arms 14 of the hooks extend inwardly so as to engage the under side edge of the coil 2. It is to be understood that these hook arms are spaced a considerable distance away from the coil to which they are applied so that they will not get unduly hot and the handles 11 and 12 can be operated at any time to get quick adjustment of the coils whereby they can be quickly adjusted, to the various cycles, i. e. pre-heating, welding and normalizing. Since the coils 1 are moved downwardly by gravity on loosening up its screws 9 and 10 the hook members are not required on this coil. From the construction described it will be seen that the coils 1 and 2 may be adjusted to move a required distance relative to each other. One or more conductors may be used in parallel for connection to the coils 1 and 2. The conductors connected to coil 1 are collectively numbered 15 and 16 while the conductors connected to coil 2 are 17 and 18. Conductors 19 and 20 run to thermo-couples which are important members in the process of welding. While only two are shown it is to be understood that the usual practice is to use a plurality of thermo-couples at different parts of the weld area so that the temperature in these various parts can be read on meters to which the thermo-couples are connected.

Each of the coils is made up of a plurality of layers. In Figure 5 the cols 1 and 2 are held in place by wedges 21 and 22 positioned over the top edge of the pipe so as to lock the coils 1 and 2 as nearly symmetrically as possible about the pipes whereby the heating produced by the coils will be circumferentially uniform. In Figure 6 we have shown one of the main turns 27 of the coil having holes 28 thereon to receive the holding studs 33, which pass through the insulators 32 that are used to separate the conductors or turns 27 as shown more specifically in the part sectional view in Figure 11. The insulators generally referred to by 32 are preferably of Transite, a strong insulating material well known in the electrical field. As shown in Figure 6 the turn 27 has an extension beyond the broken line 29 so as to form one of the outer turns 30 (see Figure 7) to which the conductors or conductor 17 are connected in a satisfactory manner as illustrated. The bottom or outer turn is identical with turn 30 placed in reversed position as shown in Figure 7 and to which the conductors 18 are connected. To close the circuit between the adjacent turns 27 a segment 23 is utilized having a hole 24 at one end to receive a stud 33 and a slot 25 at the opposite end. The segment is offset at 26 as shown in Figure 9 so as to make the space connection between the successive plate turns 27. In making up one of these coils it is all assembled as is shown in operative position on the pipes P. To install a coil all that is necessary is to loosen the stud connection at the holes 24 and slot 25 and swing all the interconnected segments 23 outwardly so that the coil can be moved into place around the pipe, it being understood that the chord 31 of the segment 23 is longer than the diameter of the pipe and the insulation thereover so that the installation as just described can be quickly made. By this construction it will be seen that the turns in each of the coils 1 and 2 are separated as defined by the offset 26 and the insulating bushing so that a large cooling surface is obtained on the coils per se without interfering with the inductive heating effect at the weld area.

From what has been said it will be seen that the coils can be quickly adjusted to a closer spacing to get the temperature to a maximum in the shortest space of time for the pre-heating cycle. After the pre-heating cycle the coils may be quickly moved apart for the welding operation or the coils may be moved towards each other if desired to raise the temperature somewhat during the brushing cycle. Some engineers may prefer to perform the brushing operation with the coils de-energized, due to the influence of the electro-magnetic field on the chips.

After considerable study and many experiments we have found that the flat copper coils have the following advantages over the wrapped coil as set forth in our patent referred to. They can be operated at a high circuit density without injury. The two copper joints in each turn carry the current in the coil at a lower operating temperature than the rest of the copper. The wire used in the wrapped winding must be insulated to prevent short circuiting. This insulation must be replaced after the completion of each weld, as the 1400° F. now used for stress relieving injuries it. Also in the heat treatment of stainless steels at 1600° F., which is the usual temperature for this metal, the insulation fails unless a water cooled conductor is used. A greater number of turns can be used in a smaller space than with the cable wrapping resulting in a smaller amount of material thereby saving power, or more turns can be used with the flat winding, thereby allowing the use of lower currents which results in the use of less cumbersome cables from the supply transformer and less voltage drop and copper loss. The flat coil winding can be placed on the pipe very quickly with less men then can the wrapped winding. The new bare flat copper coils can be used indefinitely while the wrapping cables must be re-insulated after each use.

By having the coils adjustable with respect to each other, quick, cheaper and better results can be obtained. We have found that one set of coils can be made to handle pipes of different diameters within given ranges so that a few sets of the coils will take care of practically all pipe sizes and hence they can be made and carried in stock so quick action can be obtained. It will be readily appreciated that many variations in details can be made without department from the spirit of our invention and the scope of the appended claims.

Having thus described our invention, what we claim is:

1. Means for welding a pipe joint when the pipes are in vertical position including, a pair of electrical heating coils having an internal diameter large enough so the coils can be moved lengthwise of their respective pipe sections on each side of the joint to be welded, a clamp associated with each coil and each having means for fastening the clamps to their pipe sections, each clamp having a pair of arms extending radially therefrom and spaced from each other preferably 180°, an adjusting screw carried by each arm, hooks attached to the screws on the arms of the upper coil and having fingers engaging the under side of the coil while the adjusting screws on the lower clamp have suitable ends engaging the underside of the lower coil as and for the purposes described.

2. Means for welding pipe joints in vertical position including, a pair of electrical heating coils made of flat suitable sheet metal, the turns of the coils being separated a distance from each other by suitable insulators arcuately spaced around the coil, a clamp for attachment to the pipe structure, a pair of arms fastened to the clamp in considerable arcuate spaced relation, adjusting screws carried by said arms and hooks attached to said screws and having fingers for engaging the underside of the top coil, for at least moving it away from the other coil.

3. Means for welding pipe joints as set forth in claim 1 further defined in that the clamps have readily adjustable clamping means and are preferably positioned on heat resisting insulating material while the hooks and ends of the adjusting screws that engage the bottom coil are likewise insulated with similar material.

4. Means for welding metallic joints including a pair of electrical heating coils each being made up of arcuately formed flat sheet stock of suitable current conductivity, the sheets being spaced apart a substantial distance by high heat resisting insulation such as Transite, arcuately spaced holding studs going through the insulators and sheets, each coil having an internal diameter somewhat larger than the diameter of the heat resisting material used over the pipes whereby the coils may be easily and quickly moved toward and from the weld or joint area, and quickly adjustable means operatively connected to each coil to move the coil into different heating positions.

5. Electric heating coils as set forth in claim 4 further defined in that the main turns of a coil are interconnected with segments preferably of the same kind of material as the main turns, the segments being arcuately shaped with an offset therein substantially equal to the spacing of the turns and with a stud hole in one end and a slot in the other end to removably receive a holding stud and its insulator, the chord length of the segments being such that when the grip of the two studs holding the segments in secure operative position is eased up, all of the segments can be swung around the stud in the end hole, so the body of the coil may be slipped over the pipe and then the segments returned to circuit closing position.

6. The process of butt-welding metallic members together which consists in applying unitary coil windings in relatively close relationship around the adjacent joint parts of said members, passing alternating current through said windings to establish strong alternating electro-magnetic fields uniformly around said parts to induce therein relatively quick preheating, then moving the coil windings quickly a distance apart to permit operating on the joint, then arc-welding the joint between the members and when the welding is completed, then quickly moving the coils to a position to properly normalize the weld with a controlled current.

7. The process of operating on metallic members arranged in abutting relationship which consists in applying adjustable windings around the adjacent parts of said members, adjusting the windings in relatively close relationship, then passing alternating current of a suitable strength through said windings to establish an alternating electro-magnetic field around said parts to quickly induce preheating currents in said parts, then quickly moving the windings a distance apart to allow access to the abutting area, then operating on the joint parts of said members according to the operations required including arc welding the parts together, then quickly moving the windings toward each other, to get the best normalizing results while further regulating the current to get the desired results.

8. The process of operating on metallic members arranged in abutting relationship which consists in applying adjustable windings around the adjacent parts of said members, adjusting the windings in relatively close relationship, then passing alternating current of a suitable strength through said windings to establish an alternating electro-magnetic field around said parts to quickly induce preheating currents in said parts, then quickly moving the windings a distance apart to allow access to the abutting area, while maintaining at least some current through the windings when in this more widely spaced position, the current being preferably considerably less than the preheating current, then operating on the joint parts of said members according to the operations required including arc welding the parts together, then quickly moving the windings toward each other, to get the best normalizing results while further regulating the current to get the desired results.

HARRY B. SMITH.
GEORGE A. DOLAN.

References Cited in the file of this patent
UNITED STATES PATENTS

| Number | Name | Date |
| --- | --- | --- |
| 2,176,103 | Ronay | Oct. 17, 1939 |
| 2,180,513 | Fugill et al. | Nov. 21, 1939 |
| 2,184,534 | Smith et al. | Dec. 26, 1939 |
| 2,335,495 | Fink | Nov. 30, 1943 |
| 2,365,958 | Holslag | Dec. 26, 1944 |
| 2,457,179 | Ronay | Dec. 28, 1948 |